United States Patent [19]

Maeda

[11] 4,349,735
[45] Sep. 14, 1982

[54] VEHICLE HEIGHT DETECTING DEVICE

[75] Inventor: Koichi Maeda, Kawasaki, Japan

[73] Assignee: Tokico Ltd., Kawasaki, Japan

[21] Appl. No.: 158,385

[22] Filed: Jun. 11, 1980

[30] Foreign Application Priority Data

Jun. 20, 1979 [JP] Japan .................. 54/84672[U]

[51] Int. Cl.³ ............................................. B60G 17/00
[52] U.S. Cl. .................................. 260/229; 280/6 R
[58] Field of Search ............................. 250/229, 221;
340/365 P; 280/6 R

[56] References Cited

U.S. PATENT DOCUMENTS 3,307,041 2/1967 Kling ............................. 250/229 X
3,408,501 10/1968 Thompson ...................... 250/229 X
4,105,216 8/1978 Graham et al. .
4,168,860 9/1979 Graham .

Primary Examiner—David C. Nelms
Assistant Examiner—Darwin R. Hostetter
Attorney, Agent, or Firm—Wenderoth, Lind & Ponack

[57] ABSTRACT

A vehicle height detecting device including a casing mounted on a body of a vehicle, a rotatable member rotatably disposed in the casing, a link arm connected with the rotatable member and with a member associated with a road wheel of the vehicle, and a detector provided in the casing for detecting the angular position of the rotatable member with respect to the casing. A retaining device is provided in the casing and is selectively engageable with the rotatable member at a predetermined angular position thereof.

2 Claims, 5 Drawing Figures

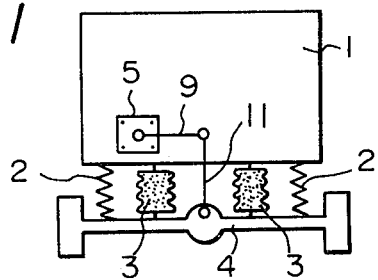
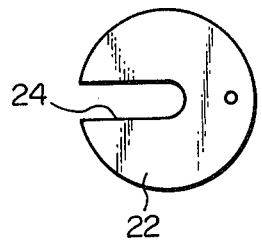
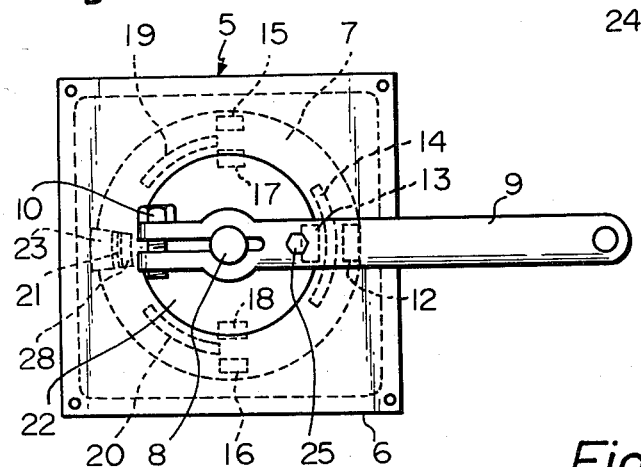
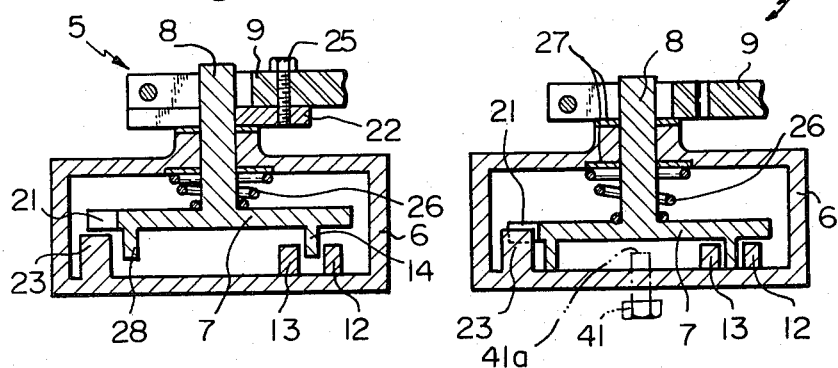

VEHICLE HEIGHT DETECTING DEVICE

BACKGROUND OF THE INVENTION

This invention relates to a vehicle height adjusting device for use in vehicles such as automobiles or trucks to detect and adjust the height of the vehicles.

Conventional vehicle height adjusting devices include a detecting device for electrically or mechanically detecting the height or the inclination of the chassis or the body of the vehicle, and an adjusting device for compensating for the change in the height or inclination of the vehicle. The detecting device usually comprises a casing secured to the body of the vehicle, a rotatable member rotatably disposed in the casing, a link arm provided outside of the casing and connected to the rotatable member and to a member such as the wheel axle or the like associated with the road wheel, and a detector provided in the casing and detecting the angular position of the rotatable member with respect to the casing. In connecting the link arm to the wheel axle and to the rotatable member, it is necessary to locate the rotatable member at a predetermined angular position in the casing and to adjust the height of the vehicle to a predetermined height. The predetermined angular position of the rotatable member in the casing has usually been determined by the electric output of the detecting device. However, the procedure is troublesome and, further, it has been difficult to obtain a high accuracy.

SUMMARY OF THE INVENTION

One object of the present invention is to overcome the shortcomings aforementioned and, according to the invention, there is provided a vehicle height detecting device of the aforementioned kind further comprising retaining means acting between the casing and the rotatable member for engaging with the rotatable member at a predetermined angular position thereof, thereby preventing the angular movement of the rotatable member, and means for selectively actuating or releasing the retaining means. Thus, it is not necessary to watch the electric output of the indicating device. Thus, the installing operation can very easily be performed.

BRIEF DESCRIPTION OF THE DRAWINGS

Some embodiments of the invention will now be explained.

FIG. 1 is a schematic view of a vehicle having a vehicle height detecting device according to the invention;

FIG. 2 is an enlarged view of the vehicle height adjusting device of FIG. 1;

FIG. 3 is a sectional view of the device of FIG. 2;

FIG. 4 is a view similar to FIG. 3 but showing a rotatable member being retained in a non-rotatable condition; and FIG. 5 is a front view of a spacer of the device of FIG. 2.

DETAILED DESCRIPTION OF THE PREFERRED EMBODIMENTS

The vehicle illustrated in FIG. 1 comprises a chassis or body 1 supported on a wheel axle 4 through suspension springs 2 and pneumatic springs 3 acting as a vehicle height adjusting device. A vehicle height detecting device 5 according to the invention is mounted on the vehicle body 1 and is connected with the wheel axle 4 through link arms 9 and 11. The link arms 9 and 11 transmit the change of the height of the vehicle body 1 with respect to the wheel axle 4 to the detecting device 5 to generate a signal which actuates a device (not shown) for supplying or exhausting compressed air into or from pneumatic springs 3, thereby adjusting the height of the vehicle.

Referring to FIGS. 2–5, the vehicle height detecting device 5 comprises a casing 6 and a rotatable member 7 rotatably disposed in the casing 6. The link arm 9 is connected to a shaft 8 of the rotatable member 7 by a clamping screw 10. It will be noted that the link arm 9 is rotatably connected to the link arm 11 which, in turn, is rotatably connected to the wheel axle 4. Thus, when the distance between the vehicle body 1 and the wheel axle 4, i.e. the height of the vehicle changes, the rotatable member 7 rotates in the casing in response to the change. For detecting the rotation of the rotatable member 7 in the casing 6, there are provided in the casing 6 a light source element 12 such as a light emissive diode and a light receiving element 13 such as a photo-transistor, and on the rotatable member 7 a projection 14. At a predetermined angular position of the rotatable member 7 in the casing 6, the projection 14 is located between the light source element 12 and the light receiving element 13, thereby intercepting the light from the element 12 and preventing it from being received on the light receiving element 13. When the rotatable member is rotated from the predetermined angular position, the projection 14 moves out from between the elements 12 and 13, and an electrical signal is generated indicating that the rotatable member 7 has been rotated out of the predetermined angular position.

There are also disposed in the casing 6 light source elements 15 and 16 and light receiving elements 17 and 18 for cooperating with projections 19 and 20 provided on the rotatable member 7. In the embodiment, when the rotatable member 7 rotates from the predetermined angular position or the reference position shown in FIG. 2 in the clockwise direction in FIG. 2, the projection 19 moves between the elements 15 and 17 to intercept the light of the element 15 and prevents it from being received by the light receiving element 17. When the rotatable member 7 rotates in the counterclockwise direction as viewed in FIG. 2, the projection 20 of the rotatable member 7 intercepts the light from the light source 16 and prevents it from being received by the light receiving element 18. According to the arrangement of FIG. 1, the rotatable member 7 rotates in the clockwise direction when the height of the vehicle increases and in the counterclockwise direction when the height of the vehicle decreases.

According to the invention, a projection 23 is formed in the casing 6 for cooperating with a circumferential cutout portion or a recess 21 formed in the rotatable member 7. Further, a spacer 22 is provided between the link arm 9 and the casing 6 to set the axial position of the rotatable member 7 in the casing 6 such that the projection 23 does not engage with the recess 21, thereby allowing the rotation of the rotatable member 7 in the casing 6. When the spacer 22 is removed as shown in FIG. 4 at the angular position of the rotatable member shown in FIG. 2, the projection 23 is received in the recess 21, thereby preventing the rotation of the rotatable member 7 in the casing 6. The projection 23 cooperating with the recess 21 constitutes retaining means according to the invention. The projection 23 engages with the recess 21 when the rotatable member 7 is displaced in the direction of the axis of the rotatable member 7 and when the member 7 is located at the predetermined angular position. The projection and the recess engagement according to the invention is not limited to the specified embodiment illustrated in FIG. 2, and the projection 23 may be formed on the rotatable member 7 to cooperate with a cut-out portion or a recessed portion such as a space defined between two circumferentially spaced projections or an axial hole or recess provided in the casing 6.

The spacer 22 acts to release the engagement of the cut-out 21 and the projection 23, and is formed, as shown in FIG. 5, so as to have a cut-out portion 24 so that the spacer 22 can be inserted between the link arm 9 and the casing 6 in the transverse direction to the shaft 8, and the spacer 22 is secured to the link arm 9 by means such as a screw 25.

A coil spring 26 is mounted between the casing 6 and the rotatable member 7 so as to bias the rotatable member 7 in the downward direction as viewed in FIGS. 3 and 4. Thus, when the spacer 22 is not in position and when the rotatable member 7 is at the predetermined angular position or the reference position, the rotatable member 7 is displaced downward so that the projection 23 engages with the cut-out 21.

Thrust washers 27 are provided to reduce the rotational resistance of the rotatable member 7 and the link arm 9 with respect to the casing 6. Shown at 28 in the drawing is a supported leg formed on the rotatable member to engage with the inner wall of the casing 6 when the rotatable member 7 is downwardly displaced by the spring 26. The projection 23 and the cut-out 21 may be formed to have circumferentially spaced and opposing side walls diverging in the downward and circumferentially outward direction, so that the projection 23 can easily and reliably be located in the cut-out 21 by simply displacing the rotatable member 7 in the downward direction.

In mounting the vehicle height detecting device 5 having the construction as described heretofore on the vehicle body 1, firstly, the height of the vehicle is adjusted to a reference height or to a desired height, then, the spacer 22 is removed so that the projection 23 engages with the cut-out 21, thereby preventing the rotation or the angular displacement of the rotatable member 7. The casing 6 of the device 5 is mounted on the vehicle body 1, and the link arm 9 is connected to the shaft 8 of the rotatable member 7 which is in the non-rotatable condition. The link arm 9 is rigidly connected to the shaft 8 by the screw 10 as shown in FIG. 4. Thereafter, the link arm 9 and the rotatable member 7 are displaced in the upward direction as viewed in FIG. 4 to form a space between the link arm 9 and the casing 6 for receiving therein the spacer 22. The spacer 22 is secured to the link arm 9 by the screw 25.

The engagement between the projection 23 and the cut-out 21 is thus released, and the rotatable member 7 rotates in response to the change in the height of the vehicle. The light receiving element 13 generates a signal detecting that the rotatable member 17 has been rotated out of the reference angular position, and the light receiving element 17 or 18 generates a signal detecting that the rotatable member 7 has rotated in the counterclockwise direction or clockwise direction in response to the decrease or increase of the height of the vehicle, whereby a control valve (not shown) is actuated to supply air under high pressure into or exhaust air from the pneumatic springs 3.

In the embodiment, retaining means consisting of the projection 23 and the cut-out 21 is actuated by removing the spacer 22. However, it is possible to make the structure such that the retaining means is actuated by inserting a spacer at a suitable location. Further, it is possible to replace the spacer 22 by a bolt 41 screwthreadingly engaging with the casing 6, as shown in chain lines in FIG. 4, with the inner end 41a thereof rotatably engaging with the rotatable member during the normal operating condition of the device. Further, the projection 23 may be axially or radially displaceably provided in the casing to engage with the cut-out 21 formed in the rotatable member.

In the embodiment, the angular displacement of the rotatable member 7 is detected by the light emitting elements and the light receiving elements. However, other detecting elements such as magnetic detecting elements, electrostatic detecting elements or the like can be used.

As described heretofore, the rotatable member can, according to the invention, be very easily and reliably located at the reference angular position without utilizing electrical output, and thus, it is possible to connect the link arm with the rotatable member at a desired relative position. The retaining means can be provided at a location remote from the axis of the rotatable member, thereby improving the accuracy of the reference angular position. The retaining means can be provided in the casing, thereby reducing the effects of dust or the like. Further, the link arm can be connected to the rotatable member at any desired angular position with respect to the shaft of the rotatable member, so that the relative position of the casing and the link arms is not limited to the specified embodiment shown in the drawings, thereby increasing the applicability of the device.

What is claimed is:

1. A vehicle height detecting device comprising: a casing member adapted to be mounted on the body of a vehicle; a rotatable member rotatably disposed in the casing member; a shaft secured to the rotatable member and projecting out of the casing member; a link arm provided outside of the casing member and connected to the shaft and adapted to be connected to a ground engaging wheel of the vehicle; a detector means provided in the casing member for detecting the angular position of the rotatable member with respect to the casing member; retaining means consisting of a recess formed in one of said members and a projection formed on the other member and engagable in said recess, for blocking the rotation of the rotatable member when the rotatable member is displaced in one direction along the axis of the shaft; a spring biasing the rotatable member in said one direction; a spacer plate removably interposed between the casing member and the link arm for preventing the rotatable member from the axial displacement in said one direction.

2. A relative motion detecting device, comprising: a casing, a rotatable member rotatable disposed in the casing member; a shaft secured to the rotatable member and projecting out of the casing member; a link arm provided outside of the casing member and connected to the shaft and adapted to be connected to a further element movable relative to the casing member; a detector means provided in the casing member for detecting the angular position of the rotatable member with respect to the casing member; retaining means consisting of a recess formed in one of said members and a projection formed on the other member and engagable in said recess, for blocking the rotation of the rotatable member when the rotatable member is displaced in one direction along the axis of the shaft; a spring biasing the rotatable member in said one direction; and a spacer plate removably interposed between the casing member and the link arm for preventing the rotatable member from the axial displacement in said one direction.

* * * * *